United States Patent [19]

Stockman

[11] Patent Number: 4,558,394
[45] Date of Patent: Dec. 10, 1985

[54] CAPACITOR UNIT WITH MULTIPLE SELECTABLE CAPACITANCE VALUES

[75] Inventor: Robert M. Stockman, Brookfield Center, Conn.

[73] Assignee: American Radionic Co., Inc., Danbury, Conn.

[21] Appl. No.: 596,012

[22] Filed: Apr. 2, 1984

[51] Int. Cl.⁴ .......................... H01G 1/14; H01G 1/13
[52] U.S. Cl. .................................... 361/306; 361/308; 361/309
[58] Field of Search ............... 361/301, 306, 307, 308, 361/309, 330, 328

[56] References Cited

U.S. PATENT DOCUMENTS 3,505,575 4/1970 Barbini ............................ 361/306 X
3,921,041 11/1975 Stockman ........................... 361/330

Primary Examiner—L. T. Hix
Assistant Examiner—Douglas S. Lee
Attorney, Agent, or Firm—Parmelee, Bollinger & Bramblett

[57] ABSTRACT

A single encapsulated wound capacitor unit (10) is made up of a number of sub-capacitors (12, 14, 16). The sub-capacitors are connected in parallel by insulated jumpers (30, 32) which extend outwardly from the capacitor encapsulant (36). A repairman may adjust the capacitance as required by cutting one or more of the exposed jumpers (30, 32) prior to installing the capacitor.

4 Claims, 3 Drawing Figures

U.S. Patent  Dec. 10, 1985  4,558,394
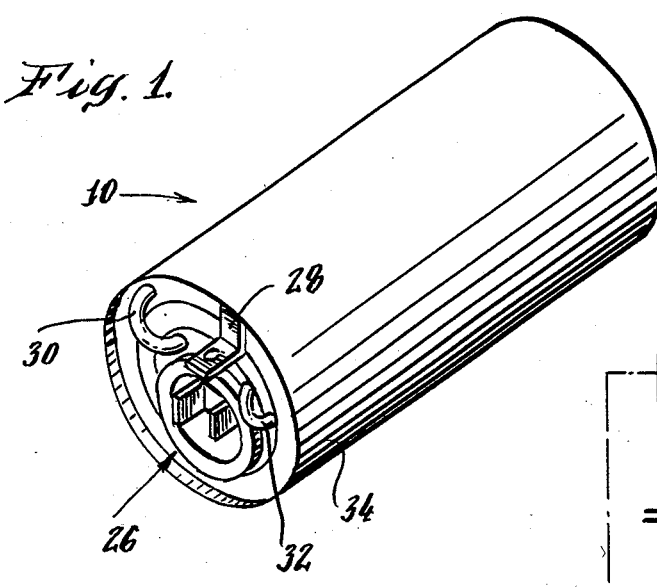
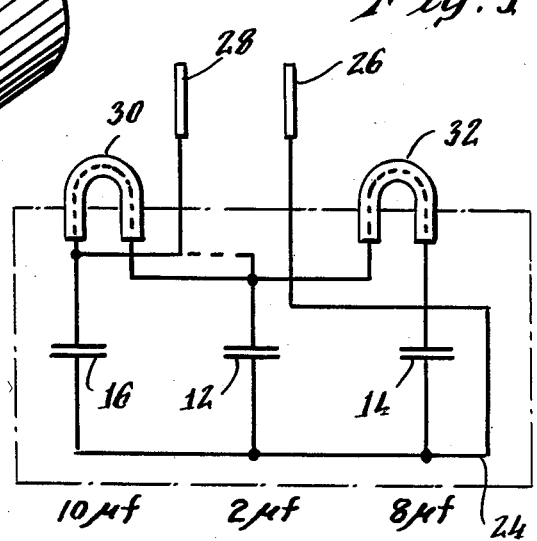
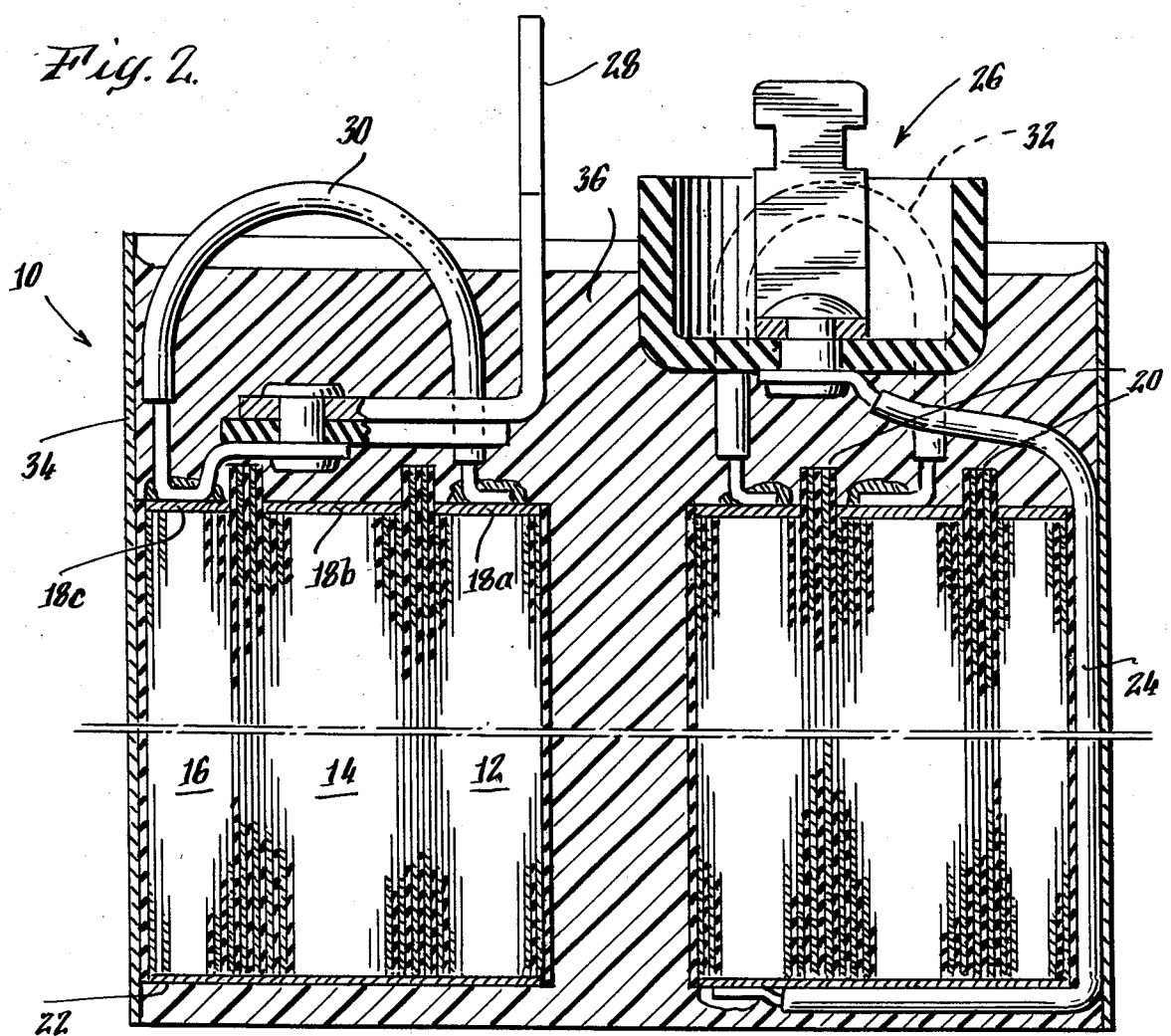

CAPACITOR UNIT WITH MULTIPLE SELECTABLE CAPACITANCE VALUES

TECHNICAL FIELD

This invention relates to electrical capacitors and, more particularly, to multiple capacitors wound in a single section. Such capacitors may be either of the metallized film or the foil-film type.

BACKGROUND ART

In my U.S. Pat. No. 3,921,041, which issued Nov. 18, 1975, there is disclosed a dual metallized capacitor. That device comprises a single capacitor section conventionally wound with two metallized films. After winding the first capacitor, the metallized layer is removed from the surface of one of the films and an insulated sheet inserted which has a length sufficient to encircle the capacitor at least once. Winding is then completed to form the second capacitor. The ends of the section are metallized to provide electrical contacts. The circular extending sheets provide barriers preventing shorting of the plates of adjacent capacitors. The concept of that invention is sufficiently broad to include any number of capacitors in a single section. In actual industrial applications, as many as twenty capacitors have been so formed in a single capacitor section.

The present invention is an improvement to that disclosed and claimed in the referenced patent. It arises from the need for a repairman to carry a large number of capacitors of different values when making service calls. As an example, an air conditioning repairman may be called upon to service a number of different sized air conditioning units in a single workday. These units may require any of a large number of capacitance values. Accordingly, the serviceman must either carry a sufficient number of capacitors to meet any possible requirement, or he must make extra trips to obtain capacitors of the proper size. It is an object of the present invention to provide a single capacitor unit which may be carried by the serviceman and varied in the field to provide any of a number of multiple capacitance values. Other objects, features, and advantages will become apparent from the following description and appended claims.

DISCLOSURE OF INVENTION

In accordance with the present invention, a capacitor unit is provided which has multiple possible capacitance values selectable by the user. The unit includes a plurality of sub-capacitors each having first and second plates separated by a dielectric. These sub-capacitors are wound concentrically and sequentially with the second and each succeeding sub-capacitor being wound upon the preceding sub-capacitor to form a single multi-capacitor section. The first plates of all the sub-capacitors extend to a first end of the section and the second plates of the sub-capacitors extend to a second end of the section. Barriers are provided for electrically separating the first plates of the sub-capacitors at the first end of the section and the second plates are electrically interconnected at the second end of the section. The section is encapsulated and includes an electrical terminal which is connected to the first plate of one of the capacitors and extends outwardly from the encapsulating means. Insulated jumpers are provided which interconnect the first plates of at least one pair of the sub-capacitors and are partially exposed externally of the encapsulant. The exposed jumpers may be cut to alter the capacitance of the capacitor unit.

BRIEF DESCRIPTION OF DRAWINGS

FIG. 1 is a perspective view of a capacitor unit in accordance with the invention;

FIG. 2 is an enlarged longitudinal cross-section of the capacitor unit of FIG. 1; and FIG. 3 is a schematic diagram of the capacitor unit of the invention.

BEST MODE FOR CARRYING OUT THE INVENTION

With particular reference to FIGS. 1 and 2, there is illustrated a capacitor unit 10 in accordance with the invention. The capacitor unit 10 comprises a plurality of sub-capacitors 12, 14, 16. The sub-capacitors are wound sequentially, one upon the other, either as discrete film and foil capacitors or as metallized film capacitors, as disclosed in the referenced patent. In either event, they are wound in such a manner that a first plate from each capacitor projects upwardly (as viewed in FIG. 2) from the sub-capacitor where it is metallized by a metallic layer 18a, b, c, the plates of the respective sub-capacitors being isolated from one another by means of projecting dielectric barriers 20. At the other end of the multiple capacitor 10, the second plates of all sub-capacitors are interconnected by means of a metallic layer 22. It will thus be understood that, as wound, the sub-capacitors 12, 14, 16 are separate and individual although having a common connection provided by metallic base layer 22. One end of a common lead 24 may be soldered to the metallic layer 22. (Alternatively, the unit might be installed in a socket having a pressure contact against base layer 22.) Lead 24 is laid along the length of the outer sub-capacitor 16 and its other end connected to a plug-in contact assembly 26. Another contact 28 is connected to the metallic layer 18c on sub-capacitor 16.

As illustrated in FIG. 2, an insulated jumper 30 interconnects the metallic layers 18a and 18c joining the first plates of sub-capacitors 12 and 16, respectively. The jumper 30 is physically arranged so that it arches upwardly a considerable distance beyond the ends of the sub-capacitors. A similar jumper 32 interconnects the metallic layers 18a, 18b to join the first plates of sub-capacitors 12, 14. The insulation of jumpers 30, 32 may be of different colors for identification purposes. Thereafter, the plural capacitor unit 10 is enclosed in a suitable wrapper 34 and its ends and other voids are encapsulated with a suitable plastic material 36. It is important to note that the encapsulant 36 permits the loops of the jumpers 30, 32 to remain exposed.

As an example of the use of the capacitor of this invention, it may be assumed that the three sub-capacitors, which are shown schematically in FIG. 3, have three different capacitance values. In the illustrated example, sub-capacitor 12 is a two microfarad capacitor, sub-capacitor 14 is an eight microfarad capacitor, and sub-capacitor 16 is a ten microfarad capacitor. It will thus be apparent that, with the jumpers 30, 32 intact, the three sub-capacitors will be in parallel so that the overall unit has a capacitance of twenty microfarads and may be installed as such by a repairman. Assume, however, that a ten microfarad capacitor is required. In that case, the repairman simply cuts the jumper 30 with a pair of wire cutters. It will then become apparent from FIG. 3 that the sub-capacitors 12, 14 are effectively removed so that the remaining capacitance is that of sub-capacitor 16—namely, ten microfarads. If, on the other hand, a capacitance of twelve microfarads is desired, the repairman would snip the jumper 32 thereby effectively removing the sub-capacitor 14 from the circuit. The remaining sub-capacitors 12, 16 would then have an overall capacitance of twelve microfarads. For convenience, the jumpers may be of different colors to facilitate proper capacitance selection.

Other modifications of this invention will be apparent to those skilled in the art. For example, if the lead 28 is simply connected to the capacitor 12, as shown by the dotted line, rather than to the capacitor 16 as shown in FIG. 3, both of jumpers 30, 32 could be cut, resulting in combinations leading to four overall capacitance values—namely 2, 10, 12 or 20 microfarads. It will also be apparent that many other variations and modifications may be made in this invention without departing from its spirit and scope. Accordingly, the foregoing description is to be construed as illustrative only, rather than limiting. This invention is limited only by the scope of the following claims.

What is claimed is:

1. A capacitor unit having multiple possible capacitance values selectable by the user which comprises:
   a plurality of sub-capacitors, each having first and second plates separated by a dielectric, wound concentrically and sequentially with the second, and each succeeding, capacitor being wound upon the preceding capacitor to form a single multi-capacitor section, the first plates of said capacitors extending to a first end of said section and the second plates of said capacitors extending to a second end of said section;
   means for electrically separating the first plates of said capacitors at the first end of said section;
   conductive means electrically interconnecting the second plates at the second end of said section;
   means encapsulating said section;
   electrical terminal means connected to the first plate of one of said capacitors and extending outwardly from said encapsulating means; and
   insulated conductor means interconnecting the first plates of at least one pair of said capacitors and partially exposed externally of said encapsulating means,
   whereby said conductor means may be cut to alter the capacitance of said capacitor unit.

2. A capacitor having multiple possible capacitances selectable by the user which comprises:
   a plurality of sub-capacitors wound sequentially one upon the other in a single multi-capacitor unit having first and second ends, each sub-capacitor having first and second plates separated by a dielectric and exposed, respectively, at said first and second ends;
   at least one dielectric barrier electrically separating the first plates of said sub-capacitors from one another at said first end;
   means for separately metallizing the first plate of each sub-capacitor at the first end of said unit;
   means for metallizing and electrically interconnecting the second plates of said sub-capacitors at the second end of said unit;
   means connected to the metallized end of said first plate of at least one of said sub-capacitors for making an external electrical connection thereto;
   means connected to the second end of said unit for making an external common electrical connection to the second plates of said sub-capacitors;
   an encapsulant enclosing said multi-capacitor unit; and
   jumper means interconnecting the first plates of at least two of said sub-capacitors and having a central portion extending outwardly from said encapsulant whereby it may be cut by a user.

3. The method of providing a single capacitor unit having multiple selectable capacitance values comprising the steps of:
   forming a single capacitor unit by winding concentrically and sequentially a plurality of sub-capacitor sections each having first and second plates separated by a dielectric, the first plate of each of said sub-capacitor sections extending to a first end of said single capacitor unit, and the second plate of each of said sub-capacitor sections extending to a second end of said single capacitor unit;
   separating said sub-capacitor sections from one another by winding a protruding insulating barrier between adjacent sub-capacitor sections, said barrier extending outwardly from the first end of said single capacitor unit;
   metallizing the first and second ends of said unit for providing electrical contacts to said first and second plates;
   connecting an electrical lead to the metallized second end of said unit;
   electrically interconnecting the first plates of said sub-capacitors with at least one insulated electrical jumper extending outwardly from said first end and bridging an intervening insulating barrier;
   connecting an electrical terminal to said first plates; and
   cutting at least one of said insulated jumpers to change the value of capacitance appearing across the terminals of said single capacitor unit.

4. The method as claimed in claim 3 including the step of encapsulating said single capacitor unit such that said electrical terminals and said insulated electrical jumper protrude outwardly from the encapsulated unit.

* * * * *